(12) United States Patent
Lee

(10) Patent No.: US 6,508,244 B2
(45) Date of Patent: Jan. 21, 2003

(54) TILE CUTTING GUIDE ARRANGEMENT FOR POWER SAW MACHINE

(76) Inventor: Wy Peron Lee, 11750 Sterling Ave. Suite C, Riverside, CA (US) 92503

( * ) Notice: Subject to any disclaimer, the term of this patent is extended or adjusted under 35 U.S.C. 154(b) by 32 days.

(21) Appl. No.: 09/847,987

(22) Filed: May 1, 2001

(65) Prior Publication Data

US 2002/0162548 A1 Nov. 7, 2002

(51) Int. Cl.[7] .................................................. B28D 1/04
(52) U.S. Cl. ................... 125/12; 125/13.01; 125/13.03; 83/435.11; 451/545
(58) Field of Search ............................. 125/12, 13.01, 125/13.03, 35, 38, 13.02, 15; 83/435.11, 435.12, 435.13, 435.14; 451/545, 406, 410, 411, 414; 33/32.1, 42, 630, 526, 527

(56) References Cited

U.S. PATENT DOCUMENTS

| | | | | | |
|---|---|---|---|---|---|
| 3,635,206 | A | * | 1/1972 | Harclerode | 125/13.03 |
| 3,807,095 | A | * | 4/1974 | Harding et al. | 125/13.03 |
| 4,428,159 | A | * | 1/1984 | Sigetich et al. | 125/13.03 |
| 4,454,793 | A | * | 6/1984 | Strong | 83/421 |
| 4,693,156 | A | * | 9/1987 | Olvera | 269/304 |
| 5,172,680 | A | * | 12/1992 | Swan | 125/12 |
| 5,676,124 | A | * | 10/1997 | Lee | 125/13.01 |
| 5,832,913 | A | * | 11/1998 | Arends | 125/13.01 |
| 6,000,387 | A | * | 12/1999 | Lee | 125/11.22 |
| 6,152,127 | A | * | 11/2000 | Fuhrman et al. | 125/13.01 |
| 6,263,866 | B1 | * | 7/2001 | Tsao | 125/13.01 |
| 6,273,081 | B1 | * | 8/2001 | Gorgol et al. | 125/13.01 |
| 6,283,110 | B1 | * | 9/2001 | Lee | 125/13.01 |

* cited by examiner

*Primary Examiner*—Joseph J. Hail, III
*Assistant Examiner*—Anthony Ojini
(74) *Attorney, Agent, or Firm*—Raymond Y. Chan; David & Raymond Patent Group

(57) ABSTRACT

A tile cutting guide arrangement includes a cutting table, slidably supported on the supporting frame, having a main cutting channel wherein a saw blade of a power saw machine is arranged to overhanging travel along the main cutting channel, and a tile guider slidably mounted on the cutting table. The tile guider includes a plurality of rip guides spacedly formed thereon wherein each rip guide has a guiding edge, which is 45 degrees with respect to the main cutting channel, adapted for guiding an edge of a tile on the cutting table, so as to align a diagonal of the tile with the main cutting channel of the cutting table.

20 Claims, 9 Drawing Sheets

TILE CUTTING GUIDE ARRANGEMENT FOR POWER SAW MACHINE

BACKGROUND OF THE PRESENT INVENTION

1. Field of Invention

The present invention relates to a power saw machine, and more particularly to a tile cutting guide arrangement specifically incorporated with the power saw machine, which can guide the tile to be cut into a predetermined shape quickly and easily.

2. Description of Related Arts

Power saw is a common machine specially used in cutting and shaping tile or other construction materials made of granite, marble, slate, pave, brick, ceramics, and masonry. A conventional power saw comprises a supporting frame comprising a cutting table slidably mounted thereon, a cutting head arrangement overhanging on the cutting table with a circular saw blade that is powered by an electric motor.

However, the conventional power saw has a major drawback that the power saw does not provide a tile guider for cutting the tile precisely. Especially when the tile is needed to be cut diagonally, a user merely use his or her experiences to adjust the position of the tile on the cutting table. Even though a right triangular shaped tile guider is incorporated with the power saw for guiding the tile on the cutting table, the tile guider can only guide one side edge of the tile such that the tile may force to be misaligned during cutting. Thus, due to the various sizes of the tile, the user always has difficulty to guide the tile by the standard size tile guider.

SUMMARY OF THE PRESENT INVENTION

A main object of the present invention is to provide a tile cutting guide arrangement for power saw machine, which can easily and quickly guide a tile on the cutting table in a corrected alignment.

Another object of the present invention is to provide a tile cutting guide arrangement for power saw machine, which comprises a tile guider having a plurality of rip guides each having a predetermined size for fittedly guiding a corresponding size of tile. In other words, the tile cutting guide arrangement fits for guiding any size of the tile.

Another object of the present invention is to provide a tile cutting guide arrangement for power saw machine, wherein a tile guider securely holds two corners of the tile to ensure the tile is in a right alignment when the tile is cut diagonally.

Another object of the present invention is to provide a tile cutting guide arrangement for power saw machine, which does not require to alter the original structure of the power saw machine, so as to minimize the manufacturing cost of the tile cutting guide arrangement incorporating with the power saw machine having a cutting table.

Accordingly, in order to accomplish the above objects, the present invention provides a tile cutting guide arrangement for power saw machine which comprises a supporting frame, a cutting head arrangement, having a circular saw blade, supported on the supporting frame, wherein the tile cutting guide arrangement comprises:

a cutting table, slidably supported on the supporting frame, having a main cutting channel wherein the saw blade is arranged to overhanging travel along the main cutting channel; and a tile guider slidably mounted on the cutting table comprising a plurality of rip guides spacedly formed on the tile guider wherein each rip guide has a guiding edge, which is 45 degrees with respect to the main cutting channel, adapted for guiding an edge of the tile, so as to align a diagonal of the tile with the main cutting channel of the cutting table.

DETAILED DESCRIPTION OF THE PREFERRED EMBODIMENT

Figure 1:
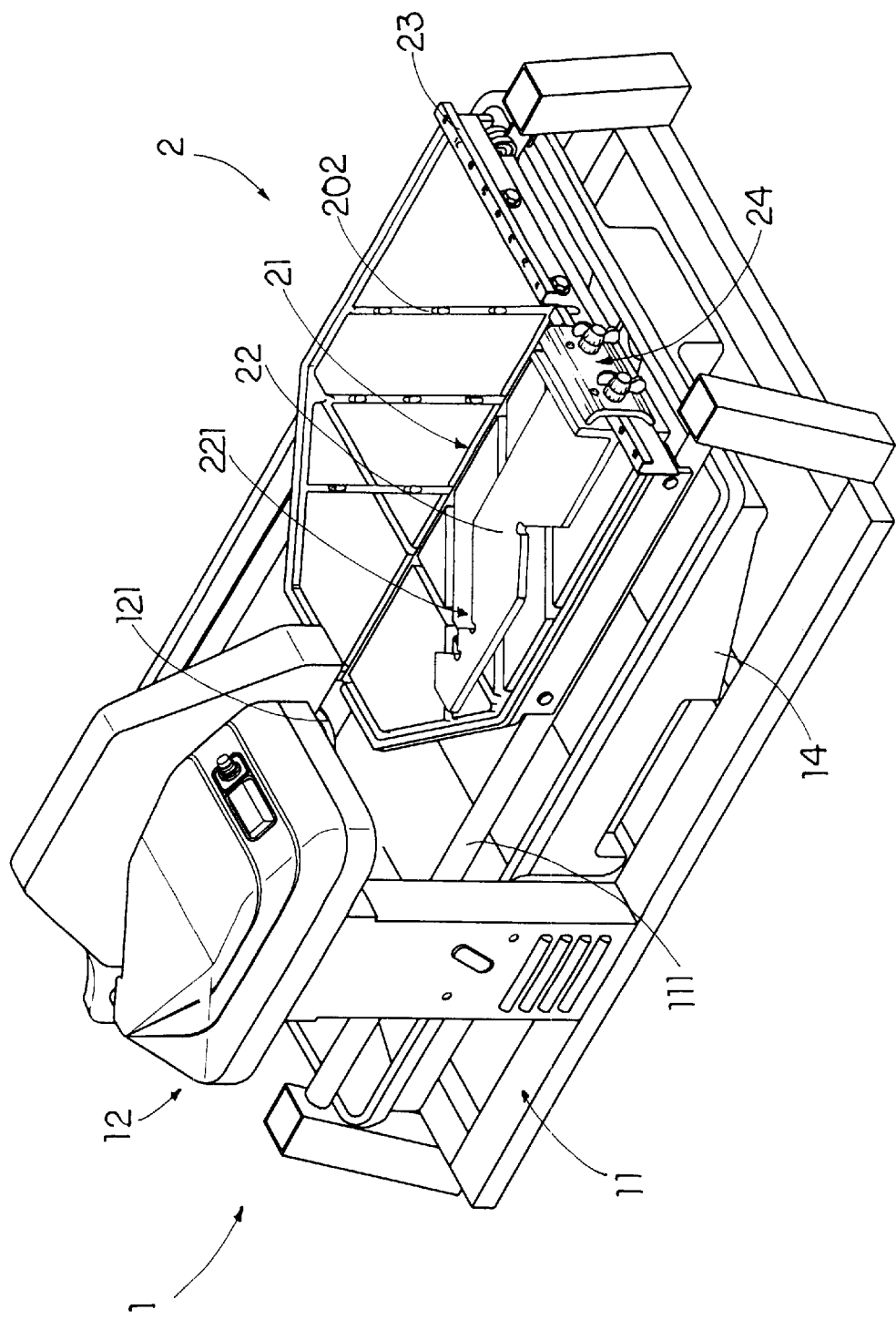
FIG. 1 is a perspective view of a power saw machine incorporated with a tile cutting guide arrangement according to a preferred embodiment of the present invention.

Referring to FIG. 1 of the drawings, a power saw machine 1 incorporated with a tile cutting guide arrangement 2 according to a preferred embodiment of the present invention is illustrated. The power saw machine 1, such as a standard power saw machine, comprises a supporting frame 11, a cutting head arrangement 12, having a circular saw blade 121, supported on the supporting frame 11 wherein the saw blade 121 is powered by a electric motor 13. The power saw machine 1 further comprises a collecting tray 14 detachably mounted underneath the supporting frame 11 for collecting a liquid coolant or a lubricant spay on the saw blade 121.

According to the preferred embodiment, the tile cutting guide arrangement 2 comprises a cutting table 20, slidably supported on the supporting frame 11, having a main cutting channel 21 wherein the saw blade 121 is arranged to overhanging travel along the main cutting channel 21 and a tile guider 22 slidably mounted on the cutting table 20 comprising a plurality of rip guides 221 spacedly formed on the tile guider 22 wherein each rip guide 221 has a guiding edge 221a, which is 45 degrees with respect to the main cutting channel 21, adapted for guiding an edge of the tile T so as to align a diagonal of the tile T with respect to the main cutting channel 21 of the cutting table 20.

Figure 2:
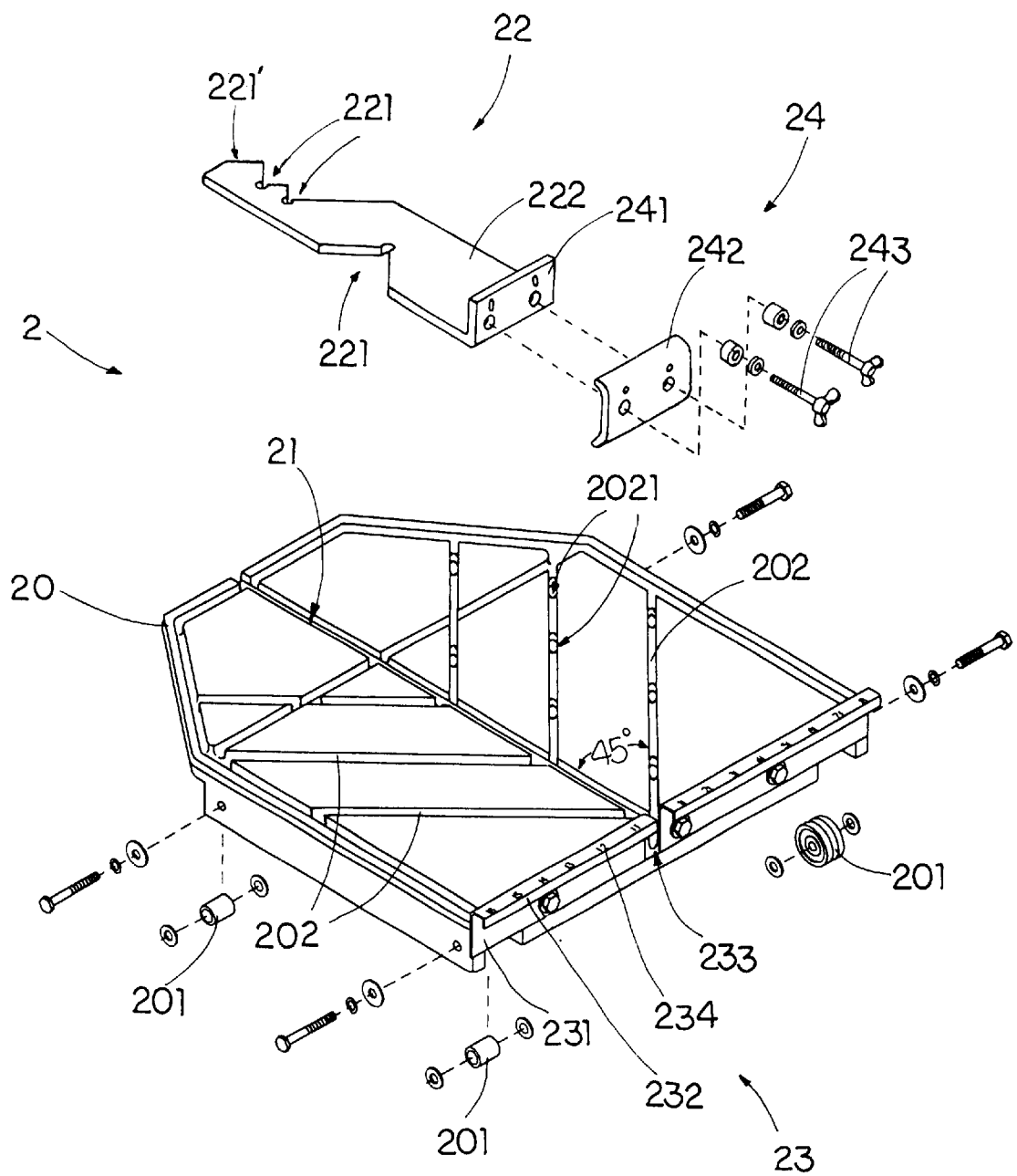
FIG. 2 is an exploded perspective view of the tile cutting guide arrangement according to the above preferred embodiment of the present invention.

As shown in FIG. 2, the cutting table 20 is slidably supported on the supporting frame 11 of the power saw machine 1 wherein the cutting table 20 comprises two pairs of wheels 201 rotatably mounted thereunder for sliding on a pair of side rails 111 provided on the supporting frame 11 of the power saw machine 1.

The cutting table 20 further has a plurality of guiding grooves 202 spacedly formed on the cutting table 20 wherein each guiding groove 202, having at least a through hole 2021, is extended from the main cutting channel 21 to a side edge of the cutting table 20 for collecting and guiding the liquid from the saw blade 121 to the collecting tray 14 through the through hole 2021. Each guiding groove 202 is inclinedly extended from the main cutting channel 21 at an angle of 45 degrees therebetween.

The tile cutting guide arrangement 2 further comprises a handle frame 23 securely mounted on the cutting table 20 perpendicularly to the main cutting channel 21 wherein the handle frame 23 comprises a mounting plate 231 firmly attached on an outer sidewall of the cutting table 20 by means of screwing bolts and a pusher handle 232 integrally and upwardly extended from the mounting plate 231 wherein the pusher handle 232 is upwardly extended above the cutting table 20 and arranged to push the cutting table 20 to slide on the supporting frame 11. A holding slot 233 is vertically formed on the pusher handle 232 wherein the holding slot 233 is aligned with the main cutting channel 21 of the cutting table 20 in such a manner that a corner of the tile T is inserted into the holding slot 233 for aligning the diagonal of the tile T with the main cutting channel 21. Thus, a measuring ruler 234 is marked along a top ceiling of the pusher handle 232 for gauging purpose.

Figure 3:
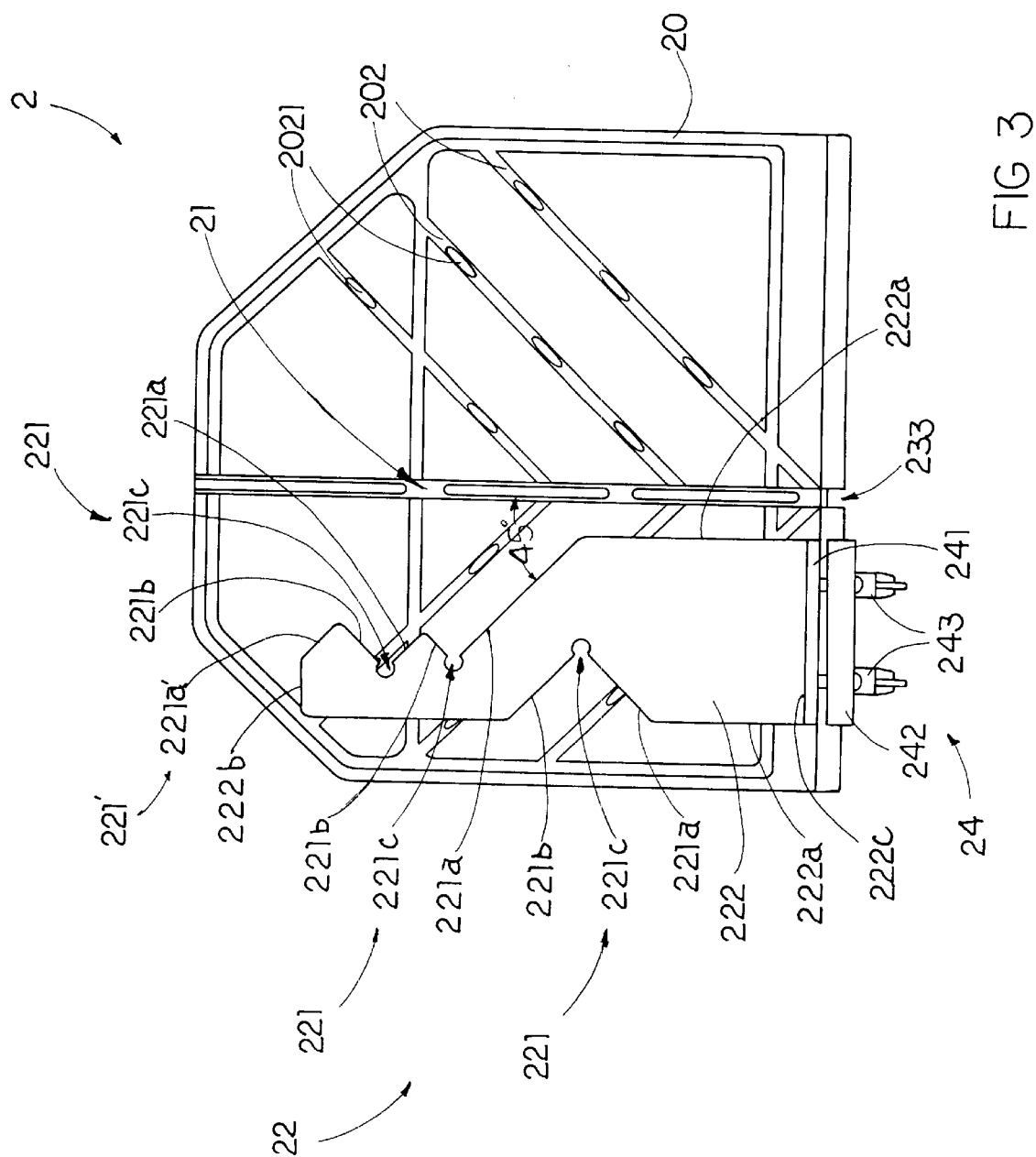
FIG. 3 is a top view of a tile guider of the tile cutting guiding arrangement according to the above preferred embodiment of the present invention.

As shown in FIG. 3, the tile guider 22 is slidably mounted on the handle frame 23 wherein the tile guider 22 comprises a guider body 222 adapted for sliding on the cutting table 20. The guider body 222 has two opposed side edges 222a which are parallel to the main cutting channel 21 of the cutting table 20.

Accordingly, the guider body 222 is cut into a predetermined shaped to form the rip guides 221 wherein the guiding edges 221a of the rip guides 221 are spacedly formed on two opposed side edges 222a of the guider body 222 in such a manner that each rip guide 221 having a predetermined shape is adapted for guiding a corresponding size of the tile T so as to align the diagonal of the tile T with the main cutting channel 21 of the cutting table 20.

Each rip guide 221 has the guiding edge 221a for guiding the edge of the tile T and a biasing edge 221b perpendicularly to the guiding edge 221a for biasing against an adjacent edge of the tile T so as to precisely guide the diagonal of the tile T align with the main cutting channel 21 of the cutting table 20. Moreover, each rip guide 221 has an enlarged round hole 221c formed at an intersection of the guiding edge 221a and the biasing edge 221b in such a manner that when the guiding edge 221a and the biasing edge 221b are respectively biased against two adjacent edges of the tile T, a corresponding corner of the tile T is inserted into the round hole 221b so as to fittedly hold the tile T by the rip guide 221.

The tile cutting guide arrangement 20 further comprises an auxiliary rip guide 221' formed on an inner portion of the guider body 222 for guiding the tile T having a size larger than 14 inches. The auxiliary rip guide 221' has an auxiliary guiding edge 221a' extended from one side edge 222a of the guider body 222 to an inner edge 222b thereof wherein an angle between the auxiliary guiding edge 221a' and the main cutting channel 21 is 45 degrees.

The tile cutting guide arrangement 20 further comprises an attaching means 24 for slidably mounting the tile guider 22 on the handle frame 23 wherein the attaching means 24 comprises a vertical panel 241 integrally and perpendicularly extended from an outer edge 222c of the guider body 222 edge to edge and a mounting clamp 242 having at least a hand screw 243 rotatably penetrated through the mounting clamp 242 to the vertical panel 241 and arranged to adjustably clamp on the pusher handle 232 so as to securely lock up the tile guider 22 on the handle frame 23. In other words, by rotatably releasing the hand screw 243, the tile guider 22 is freely slid on the cutting table 20 along the handle frame 23, and by rotatably tightening the hand screw 243, the tile guider 22 is locked up on the handle frame 23.

Generally, the tile T has a square shape and there are four sizes of the tile T, which are 8 inches, 12 inches, 14 inches, and over 14 inches. The tile guider 22 of the tile cutting guide arrangement 20 of the present invention is capably of guiding all the four sizes of the tile T on the cutting table 20 so as to align the diagonal of the tile T with the main cutting channel 21 of the cutting table 20.

Figure 4A:
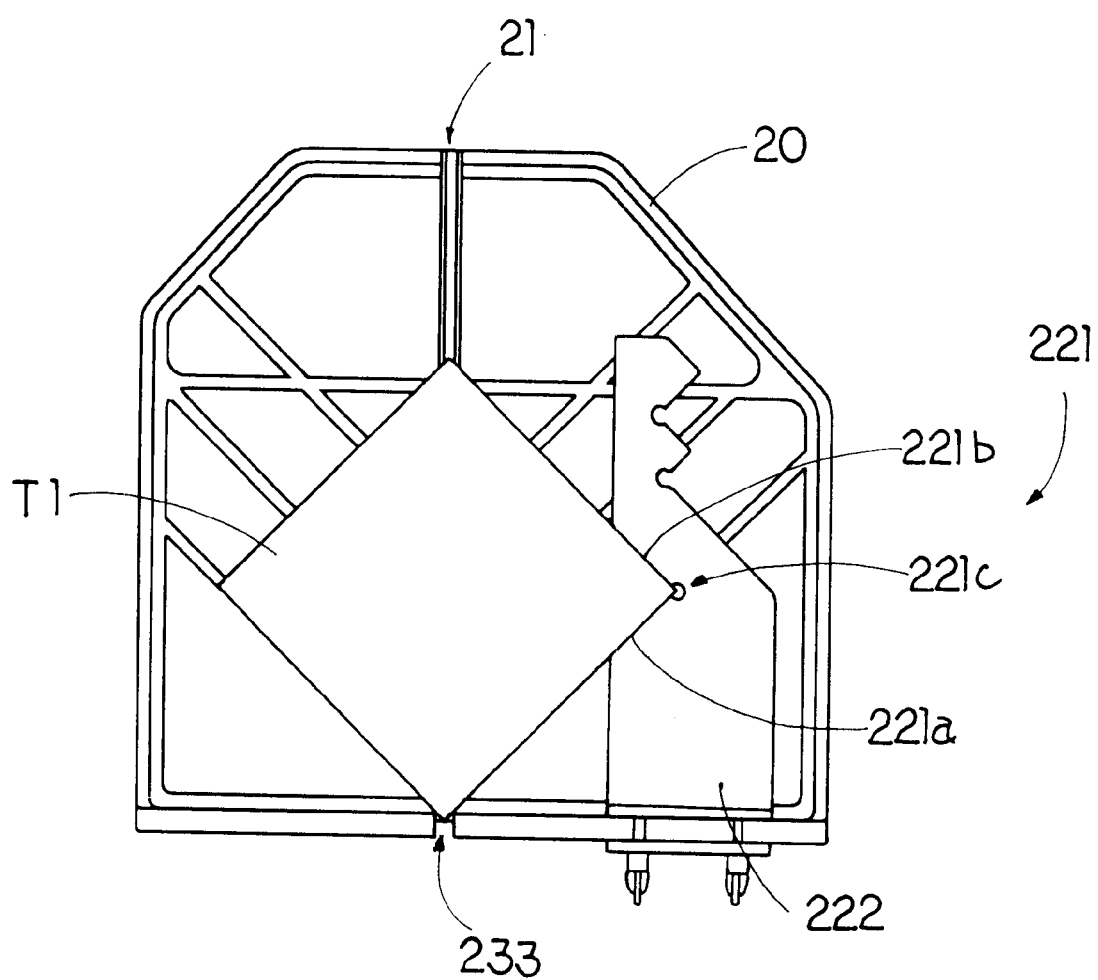
FIGS. 4A to 4E are top views of the tile cutting guide arrangement according to the above preferred embodiment of the present invention, illustrating the tile guider guiding different sizes of the tile.
Figure 4B:
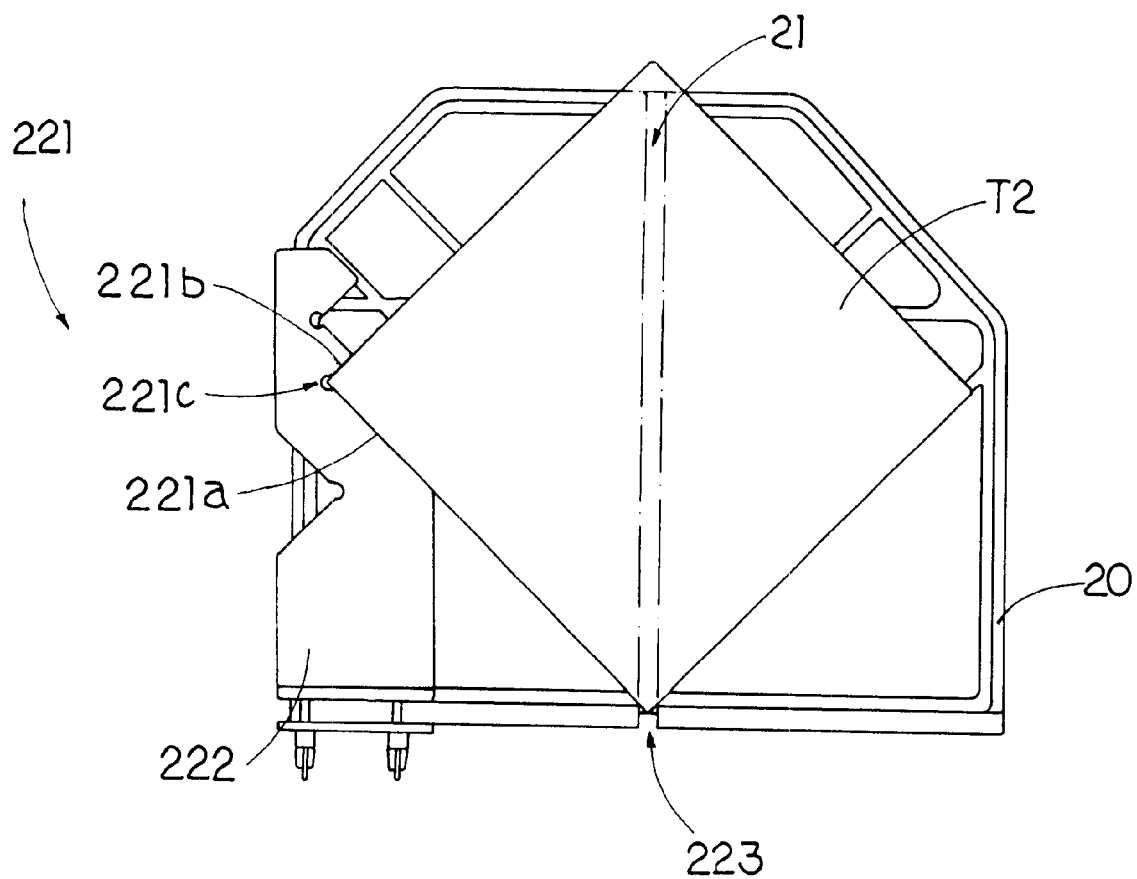
Figure 4C:
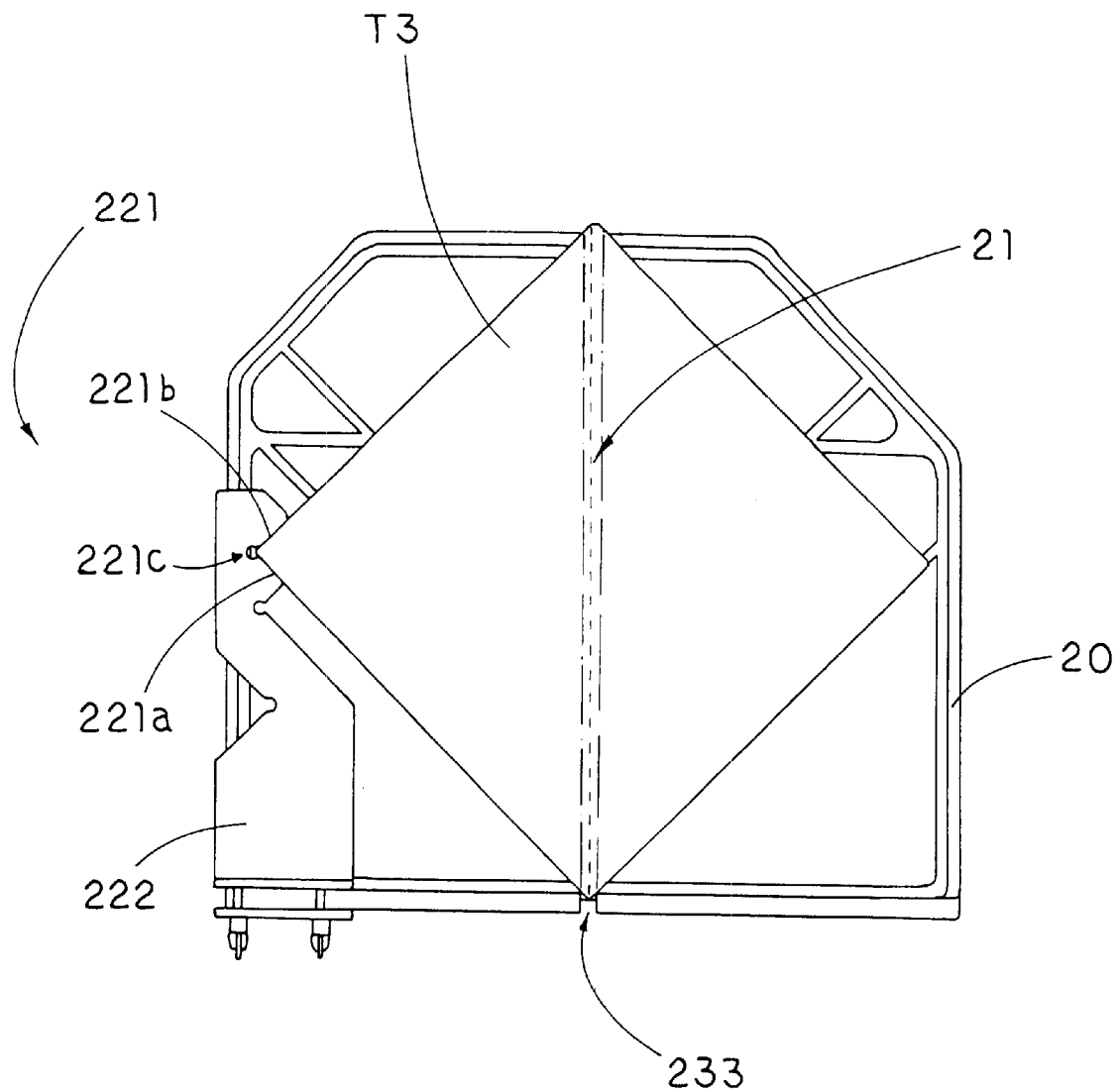
Figure 4D:
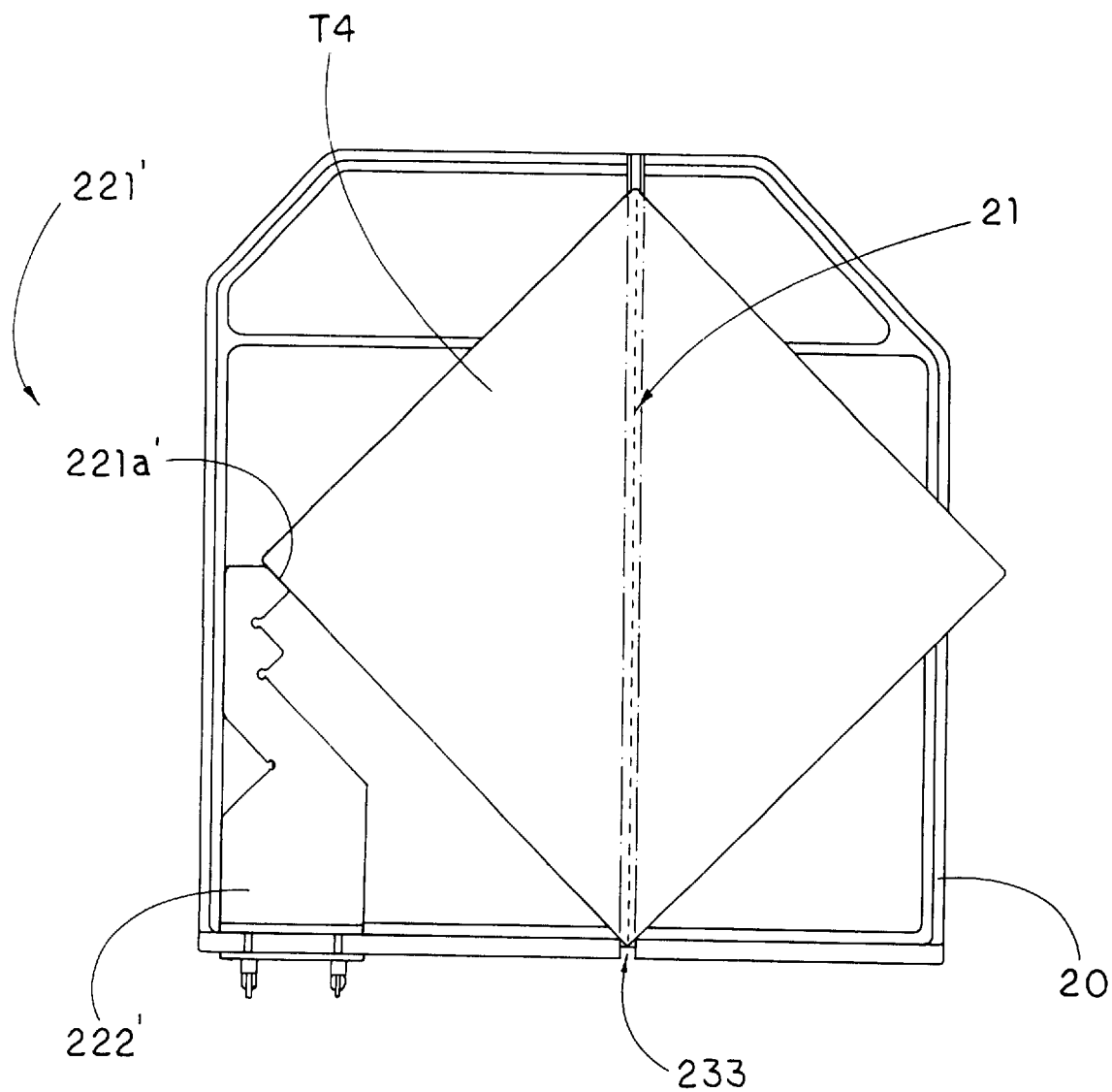

FIGS. 4A through 4C illustrate the tile guider 22 is capable of guiding the 8-inch tile T1, the 12-inch tile T2, and the 14-inch tile T3 respectively wherein the rip guides 221 for the corresponding sizes of the tiles T1 to T3 are spacedly provided on the guider body 222 from the outer edge 222c to the inner edge 222b thereof. FIG. 4D, the tile T4 having a size over 14 inches is guided by the auxiliary guiding edge 221a' of the auxiliary rip guide 211'. In other words, the rip guide 221 for the 8-inch tile T1 is positioned close to the outer edge 222c of the guider body 222 and the auxiliary rip guide 221' for the tile T4 having a size over 14 inches is positioned at the inner edge 222b of the guider body 222. It is worth to mention that the tile guider 22 is capable of incorporating with a conventional power saw machine such that when cutting a larger size of tile T having 14 inches or up, the power saw machine having a bigger cutting table is needed, as shown in FIGS. 4C and 4D. In other words, the tile guider 22 can fit to precisely guide all sizes of tile T when incorporating with a corresponding size of the power saw machine 1.

As shown in FIGS. 4A to FD, the rip guide 211 biases against two adjacent edges of the tile T by the guiding edge 221a and the biasing edge 221b respectively and two adjacent corners are inserted into the round hole 221c of the respective rip guide 221 and the holding slot 233 of the handle frame 23, so as to hold the tile T on the cutting table 20 in position and ensure the diagonal of the tile T align with the main cutting channel 21.

Figure 4E:
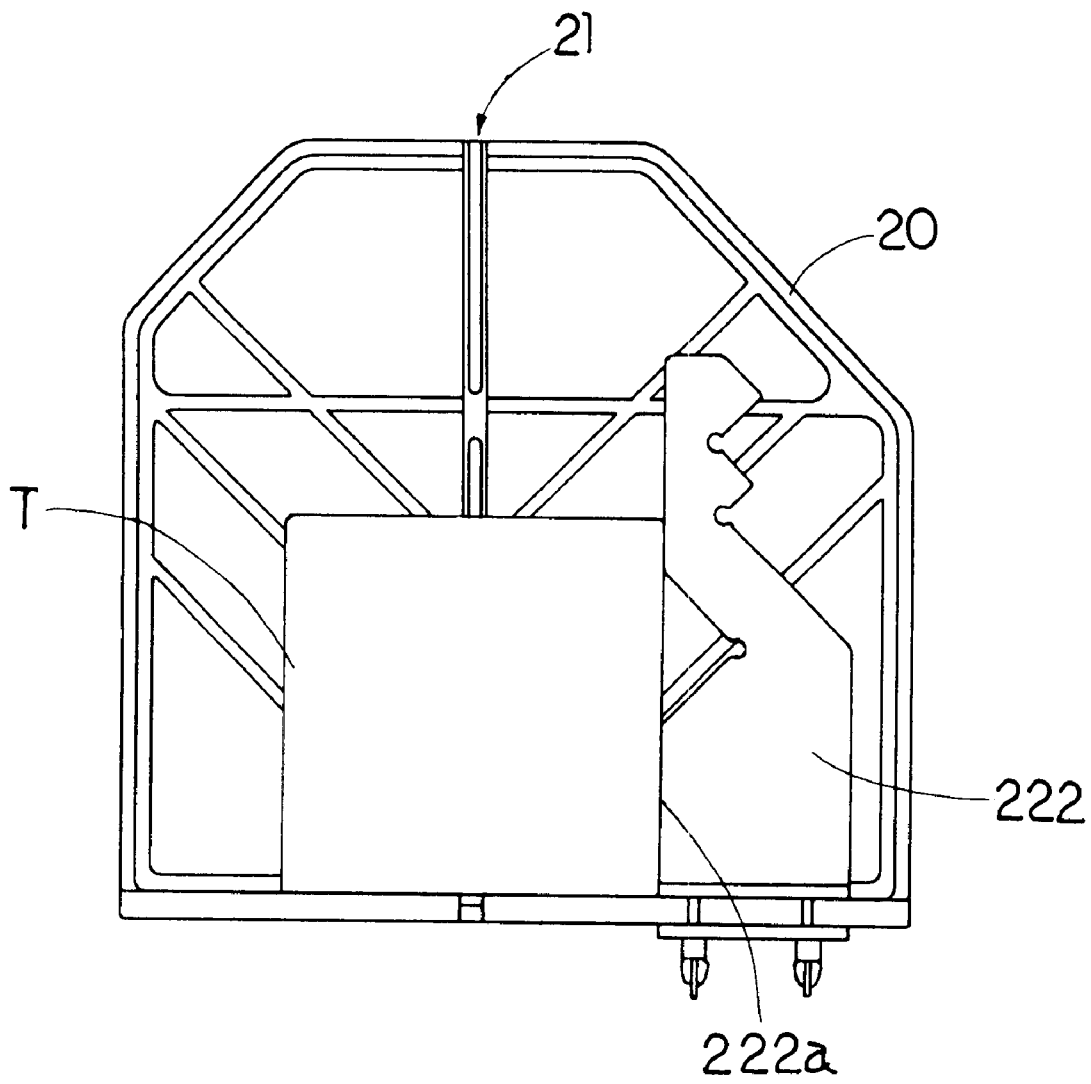

FIG. 4E illustrates the tile guider 221 is capable of guiding the tile T on the cutting table 20 for a straight cut wherein an edge of the tile T is biased against one of the side edge 222a of the guider body 222 of the tile guider 22 while an adjacent edge of the tile T is biased against the pusher handle 232 in such a manner that a width of the tile T is perpendicularly to the main cutting channel 21 for the straight cut of the tile T.

Figure 5:
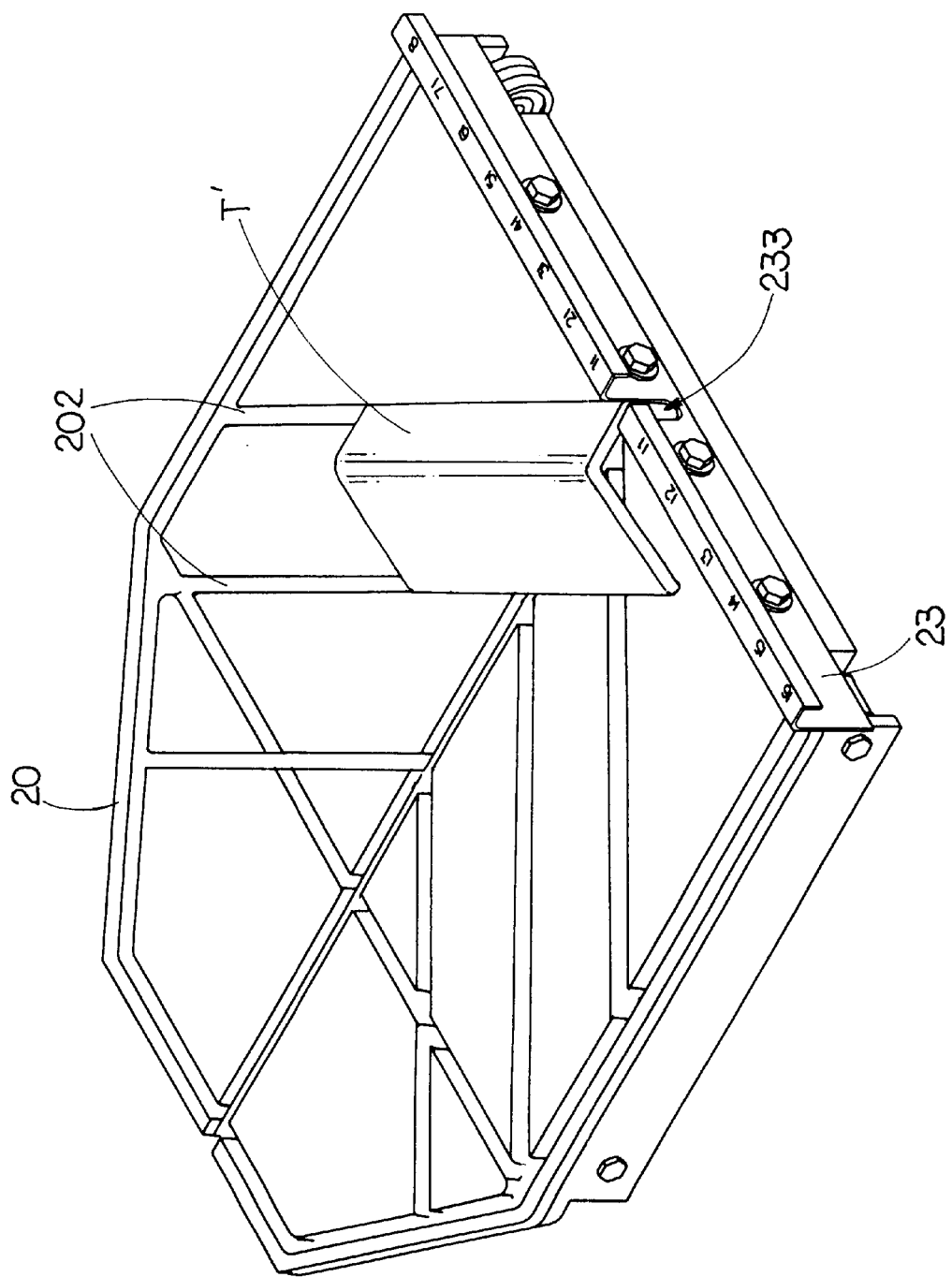
FIG. 5 is a perspective view of the tile cutting guide arrangement for guiding a L-shaped tile according to the above preferred embodiment of the present invention.

FIG. 5 illustrates a tile T' having a L-shaped cross section is guided by the tile cutting guide arrangement 2 for a 45-degree slant cut wherein the tile T' has two edges adapted for receiving in the two adjacent parallel guiding grooves 202 on the cutting table 20 in such a manner that the tile T' is positioned 45 degrees with respect to the main cutting channel 21.

What is claimed is:

1. A power saw machine, comprises:
   a supporting frame;
   a cutting head arrangement, having a circular saw blade, supported on the supporting frame; and
   a tile cutting guide arrangement, comprising:
      a cutting table, slidably supported on said supporting frame, having a main cutting channel wherein said saw blade is arranged to overhanging travel along said main cutting channel; and
      a tile guider slidably mounted on said cutting table comprising a plurality of rip guides spacedly formed on said tile guider wherein each said rip guide has a guiding edge, which is 45 degrees with respect to said main cutting channel, adapted for guiding an edge of said tile, so as to align a diagonal of said tile with said main cutting channel of said cutting table.

2. A power saw machine, as recited in claim 1, wherein each said rip guide further has a biasing edge perpendicularly to said guiding edge for biasing against an adjacent edge of said tile so as to precisely guide said diagonal of said tile align with said main cutting channel of said cutting table.

3. A power saw machine, as recited in claim 2, wherein said tile guider comprises a guider body adapted for sliding on said cutting table, said guider body being cut into a predetermined shaped to form said rip guides in such a manner that said guiding edges of said rip guides are spacedly formed by two opposed side edges of said guider body.

4. A power saw machine, as recited in claim 3, wherein tile guider further comprises an auxiliary rip guide for guiding a tile having a size larger than 14 inches wherein said auxiliary rip guide has an auxiliary guiding edge extended from one side edge of said guider body to an inner edge thereof wherein an angle between said auxiliary guiding edge and said main cutting channel is 45 degrees.

5. A power saw machine, as recited in claim 4, wherein each said rip guide has an enlarged round hole formed at an intersection of said guiding edge and said biasing edge in such a manner that when said guiding edge and said biasing edge are respectively biased against two adjacent edges of said tile, a corresponding corner of said tile is inserted into said round hole so as to fittedly hold said tile by said rip guide.

6. A power saw machine, as recited in claim 5, wherein said tile cutting guide arrangement further comprises a handle frame securely mounted on said cutting table and perpendicularly to said main cutting channel wherein said handle frame comprises a mounting plate firmly attached on an outer sidewall of said cutting table and a pusher handle integrally and upwardly extended from said mounting plate wherein a holding slot is vertically formed on said pusher handle and aligned with said main cutting channel of said cutting table in such a manner that an adjacent corner of said tile is inserted into said holding slot for further aligning said diagonal of said tile with said main cutting channel.

7. A power saw machine, as recited in claim 6, wherein said cutting table further has a plurality of guiding grooves spacedly formed on said cutting table wherein each guiding groove, having at least a through hole, is extended from said main cutting channel to a side edge of said cutting table at an angle of 45-degree.

8. A power saw machine, as recited in claim 7, wherein said tile cutting guide arrangement further comprises an attaching means for slidably mounting said tile guider on said handle frame wherein said attaching means comprises a vertical panel integrally and perpendicularly extended from an outer edge of said guider body edge to edge and a mounting clamp having at least a hand screw rotatably penetrated through said mounting clamp to said vertical panel and arranged to adjustably clamp on said pusher handle so as to securely lock up said tile guider on said handle frame.

9. A power saw machine, as recited in claim 6, wherein said tile cutting guide arrangement further comprises an attaching means for slidably mounting said tile guider on said handle frame wherein said attaching means comprises a vertical panel integrally and perpendicularly extended from an outer edge of said guider body edge to edge and a mounting clamp having at least a hand screw rotatably penetrated through said mounting clamp to said vertical panel and arranged to adjustably clamp on said pusher handle so as to securely lock up said tile guider on said handle frame.

10. A power saw machine, as recited in claim 5, wherein said cutting table further has a plurality of guiding grooves spacedly formed on said cutting table wherein each guiding groove, having at least a through hole, is extended from said main cutting channel to a side edge of said cutting table at an angle of 45-degree.

11. A power saw machine, as recited in claim 5, wherein said tile cutting guide arrangement further comprises an attaching means for slidably mounting said tile guider on said handle frame wherein said attaching means comprises a vertical panel integrally and perpendicularly extended from an outer edge of said guider body edge to edge and a mounting clamp having at least a hand screw rotatably penetrated through said mounting clamp to said vertical panel and arranged to adjustably clamp on said pusher handle so as to securely lock up said tile guider on said handle frame.

12. A power saw machine, as recited in claim 4, wherein said cutting table further has a plurality of guiding grooves spacedly formed on said cutting table wherein each guiding groove, having at least a through hole, is extended from said main cutting channel to a side edge of said cutting table at an angle of 45-degree.

13. A power saw machine, as recited in claim 3, wherein each said rip guide has an enlarged round hole formed at an intersection of said guiding edge and said biasing edge in such a manner that when said guiding edge and said biasing edge are respectively biased against two adjacent edges of said tile, a corresponding corner of said tile is inserted into said round hole so as to fittedly hold said tile by said rip guide.

14. A power saw machine, as recited in claim 3, wherein said tile cutting guide arrangement further comprises a handle frame securely mounted on said cutting table and perpendicularly to said main cutting channel wherein said handle frame comprises a mounting plate firmly attached on an outer sidewall of said cutting table and a pusher handle integrally and upwardly extended from said mounting plate wherein a holding slot is vertically formed on said pusher handle and aligned with said main cutting channel of said cutting table in such a manner that an adjacent corner of said tile is inserted into said holding slot for further aligning said diagonal of said tile with said main cutting channel.

15. A power saw machine, as recited in claim 3, wherein said cutting table further has a plurality of guiding grooves spacedly formed on said cutting table wherein each guiding groove, having at least a through hole, is extended from said main cutting channel to a side edge of said cutting table at an angle of 45-degree.

16. A power saw machine, as recited in claim 2, wherein each said rip guide has an enlarged round hole formed at an intersection of said guiding edge and said biasing edge in such a manner that when said guiding edge and said biasing edge are respectively biased against two adjacent edges of said tile, a corresponding corner of said tile is inserted into said round hole so as to fittedly hold said tile by said rip guide.

17. A power saw machine, as recited in claim 2, wherein said tile cutting guide arrangement further comprises a handle frame securely mounted on said cutting table and perpendicularly to said main cutting channel wherein said handle frame comprises a mounting plate firmly attached on an outer sidewall of said cutting table and a pusher handle integrally and upwardly extended from said mounting plate wherein a holding slot is vertically formed on said pusher handle and aligned with said main cutting channel of said cutting table in such a manner that an adjacent corner of said tile is inserted into said holding slot for further aligning said diagonal of said tile with said main cutting channel.

18. A power saw machine, as recited in claim 1, wherein said tile guider comprises a guider body adapted for sliding on said cutting table, said guider body being cut into a predetermined shaped to form said rip guides in such a manner that said guiding edges of said rip guides are spacedly formed by two opposed side edges of said guider body.

19. A power saw machine, as recited in claim 18, wherein tile guider further comprises an auxiliary rip guide for guiding a tile having a size larger than 14 inches wherein said auxiliary rip guide has an auxiliary guiding edge extended from one side edge of said guider body to an inner edge thereof wherein an angle between said auxiliary guiding edge and said main cutting channel is 45 degrees.

20. A power saw machine, as recited in claim 1, wherein said tile cutting guide arrangement further comprises a handle frame securely mounted on said cutting table and perpendicularly to said main cutting channel wherein said handle frame comprises a mounting plate firmly attached on an outer sidewall of said cutting table and a pusher handle integrally and upwardly extended from said mounting plate wherein a holding slot is vertically formed on said pusher handle and aligned with said main cutting channel of said cutting table in such a manner that an adjacent corner of said tile is inserted into said holding slot for further aligning said diagonal of said tile with said main cutting channel.

\* \* \* \* \*